(12) United States Patent
Khayms et al.

(10) Patent No.: US 12,058,107 B2
(45) Date of Patent: *Aug. 6, 2024

(54) ELECTRONIC MESSAGE PROCESSING SYSTEMS AND METHODS

(71) Applicant: PROOFPOINT, INC., Sunnyvale, CA (US)

(72) Inventors: Alina V. Khayms, Sunnyvale, CA (US); Gregory Lee Wittel, Mountain View, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,509

(22) Filed: Feb. 10, 2023

(65) Prior Publication Data

US 2023/0188499 A1 Jun. 15, 2023

Related U.S. Application Data

(63) Continuation of application No. 16/836,501, filed on Mar. 31, 2020, now Pat. No. 11,582,190.

(Continued)

(51) Int. Cl.
*H04L 51/212* (2022.01)
*G06F 9/54* (2006.01)
*H04L 9/40* (2022.01)

(52) U.S. Cl.
CPC .......... *H04L 63/0245* (2013.01); *G06F 9/546* (2013.01); *H04L 51/212* (2022.05); *H04L 63/1416* (2013.01); *H04L 63/20* (2013.01)

(58) Field of Classification Search
CPC ............. H04L 63/0245; H04L 63/0227; H04L 63/123; H04L 63/1416; H04L 63/1466;

(Continued)

(56) References Cited

U.S. PATENT DOCUMENTS 6,421,709 B1 * 7/2002 McCormick .......... H04L 51/212
  709/206
6,615,242 B1 * 9/2003 Riemers ................ H04L 51/212
  709/225

(Continued)

OTHER PUBLICATIONS

N. Barigou, F. Barigou and B. Atmani, "Voting multiple classifiers decisions for spam detection," 2012 International Conference on Information Technology and e-Services, Sousse, Tunisia, 2012, pp. 1-6, doi: 10.1109/ICITeS.2012.6216599. (Year: 2012).*

(Continued)

*Primary Examiner* — Michael Simitoski
(74) *Attorney, Agent, or Firm* — SPRINKLE IP LAW GROUP

(57) ABSTRACT

A message-hold decision maker system used with an electronic mail processing system that processes electronic messages for a protected computer network improves the electronic mail processing system's performance by increasing the throughput performance of the system. The improvements are achieved by providing an electronic mail processing gateway with additional logic that makes fast and intelligent decisions on whether to hold, block, allow, or sandbox electronic messages in view of potential threats such as viruses or URL-based threats. A message hold decision maker uses current and stored information from a plurality of specialized classification engines to quickly make the decisions. In some examples, the message hold decision maker will instruct an email gateway to hold an electronic mail message while the classification engines perform further analysis.

23 Claims, 3 Drawing Sheets

Related U.S. Application Data

(60) Provisional application No. 62/972,464, filed on Feb. 10, 2020.

(58) Field of Classification Search
CPC ....... H04L 63/20; H04L 51/212; H04L 51/08; H04L 51/18; G06F 9/546; G06Q 10/107
See application file for complete search history.

(56) References Cited

U.S. PATENT DOCUMENTS

| | | | | |
|---|---|---|---|---|
| 6,691,156 B1* | 2/2004 | Drummond | ........... | H04L 51/212 709/206 |
| 6,732,157 B1* | 5/2004 | Gordon | ................ | G06Q 10/107 707/999.01 |
| 6,757,830 B1* | 6/2004 | Tarbotton | .............. | H04L 51/212 713/188 |
| 7,293,063 B1* | 11/2007 | Sobel | ................... | G06Q 10/107 709/206 |
| 7,539,726 B1* | 5/2009 | Wilson | ................. | G06Q 10/107 726/13 |
| 7,680,890 B1* | 3/2010 | Lin | ....................... | G06Q 10/107 706/900 |
| 7,930,353 B2* | 4/2011 | Chickering | ........... | H04L 51/212 709/225 |
| 8,321,936 B1* | 11/2012 | Green | ................. | H04L 63/1416 718/1 |
| 8,479,294 B1* | 7/2013 | Li | ........................... | G06F 21/56 726/25 |
| 8,862,675 B1* | 10/2014 | Coomer | ............... | H04L 51/212 709/224 |
| 10,630,631 B1* | 4/2020 | Yague | ................... | H04L 51/212 |
| 10,764,313 B1* | 9/2020 | Mushtaq | ................ | G06N 20/00 |
| 11,100,144 B2* | 8/2021 | Galitsky | .................. | G06N 7/01 |
| 2002/0199095 A1* | 12/2002 | Bandini | ............. | H04L 63/0245 713/151 |
| 2003/0088627 A1* | 5/2003 | Rothwell | ............. | H04L 51/212 709/224 |
| 2003/0149726 A1* | 8/2003 | Spear | ................. | H04L 61/4555 709/206 |
| 2004/0073617 A1* | 4/2004 | Milliken | ............... | G06F 21/562 709/224 |
| 2004/0083270 A1* | 4/2004 | Heckerman | ........... | H04L 51/212 709/207 |
| 2004/0128355 A1* | 7/2004 | Chao | ....................... | H04L 63/14 709/206 |
| 2004/0215977 A1* | 10/2004 | Goodman | ............. | H04L 51/212 726/22 |
| 2005/0050150 A1* | 3/2005 | Dinkin | ................. | G06Q 10/107 709/207 |
| 2005/0076084 A1* | 4/2005 | Loughmiller | ........ | G06Q 10/107 706/20 |
| 2005/0081059 A1* | 4/2005 | Bandini | .............. | H04L 63/0245 726/4 |
| 2005/0102366 A1* | 5/2005 | Kirsch | ................. | G06Q 10/107 709/229 |
| 2005/0165895 A1* | 7/2005 | Rajan | .................... | G06Q 10/107 709/206 |
| 2006/0277264 A1* | 12/2006 | Rainisto | ................ | H04L 51/212 709/206 |
| 2007/0079379 A1* | 4/2007 | Sprosts | ................. | H04L 63/145 726/24 |
| 2009/0157708 A1* | 6/2009 | Bandini | .............. | H04L 63/0245 |
| 2011/0246583 A1* | 10/2011 | Vitaldevara | .......... | G06Q 10/107 709/206 |
| 2011/0265013 A1* | 10/2011 | Koopman | ............. | H04L 51/212 715/752 |
| 2015/0007312 A1* | 1/2015 | Pidathala | ........... | H04L 63/1433 726/22 |
| 2016/0142352 A1* | 5/2016 | Skudlark | ............. | H04L 63/1408 709/206 |
| 2018/0212904 A1* | 7/2018 | Smullen | ................... | H04L 67/02 |
| 2019/0007438 A1* | 1/2019 | Viktorov | ................. | H04L 63/20 |
| 2019/0068616 A1* | 2/2019 | Woods | ................. | H04L 63/145 |
| 2020/0004956 A1* | 1/2020 | Romanenko | .......... | G06N 20/20 |
| 2020/0234109 A1* | 7/2020 | Lee | .......................... | G06N 3/08 |
| 2021/0200870 A1* | 7/2021 | Yavo | .................. | H04L 63/1416 |
| 2021/0216916 A1* | 7/2021 | Madhavan | .......... | G06F 18/2451 |

OTHER PUBLICATIONS

A. Chharia and R. K. Gupta, "Email classifier: An ensemble using probability and rules," 2013 Sixth International Conference on Contemporary Computing (IC3), Noida, India, 2013, pp. 130-136, doi: 10.1109/IC3.2013.6612176. (Year: 2013).*

Examination Report issued by the European Patent Office for U.S. Patent Application No. 21156118.8, mailed Nov. 21, 2023, 13 pages.

\* cited by examiner

ELECTRONIC MESSAGE PROCESSING SYSTEMS AND METHODS

CROSS-REFERENCE TO RELATED APPLICATION(S)

This application is a continuation of, and claims a benefit of priority under 35 U.S.C. 120 of, U.S. patent application Ser. No. 16/836,501 filed Mar. 31, 2020, issued as U.S. Pat. No. 11,582,190, entitled "ELECTRONIC MESSAGE PROCESSING SYSTEMS AND METHODS," which claims a benefit of priority under 35 U.S.C. § 119(e) from U.S. Provisional Application No. 62/972,464, filed Feb. 10, 2020, entitled "ELECTRONIC MESSAGE PROCESSING SYSTEMS AND METHODS," which are fully incorporated by reference herein for all purposes.

TECHNICAL FIELD

This invention relates generally to electronic message processing and threat protection. More particularly, this invention relates to systems, methods, and computer program products for processing electronic messages (email) for a protected computer network and providing a message-hold decision on a potential threat in near real time.

BACKGROUND OF THE RELATED ART

Sandboxing is a technique in which an isolated test environment, i.e., a "sandbox," is used to scan (e.g., execute or test) a suspicious file or universal resource locator (URL) that is attached to, embedded in, or otherwise included in an email coming into a computer network. A threat protection system can observe what happens in the sandbox and take appropriate action.

However, sandboxing is computationally expensive and time consuming which, in turn, can cause delay in email processing. Further, current solutions do not scale well and can only handle a small fraction of the email traffic.

In view of the foregoing, there is a need for a network-based, computer implemented solution that can process electronic messages for a protected computer network in an efficient, effective, and scalable manner. Embodiments of an invention disclosed herein can address this need and more.

SUMMARY OF THE DISCLOSURE

Embodiments disclosed herein can be useful for improving the efficacy and efficiency of an electronic mail processing gateway that processes electronic messages for a protected computer network. A goal of the invention disclosed herein is to improve the electronic mail processing system's performance by increasing the throughput performance of the system. The invention enables the system to process incoming electronic mail messages quickly, with most being processed in real-time.

In some embodiments, this goal can be accomplished by leveraging current and past results from a plurality of synchronous and asynchronous classifiers. When a decision regarding an email cannot be determined immediately, some embodiments enable the system to hold an electronic mail message, while a message hold decision maker performs further analysis.

In some embodiments, a method for processing electronic mail messages in a protected computer network can include receiving, by an electronic mail processing gateway, an electronic mail message, analyzing, by the electronic mail processing gateway, the electronic mail message to detect any malicious content in the electronic mail, making an API call to a message hold decision maker, the API call including metadata describing the electronic mail message, determining, by the message hold decision maker, whether the electronic mail processing gateway should deliver the electronic mail message or hold the electronic mail message, wherein determining further comprises detecting, by one or more classification engines, the presence of malicious content in the electronic mail message, and wherein the message hold decision maker determines whether the electronic mail processing gateway should deliver the electronic mail message or hold the electronic mail message based on results obtained by the one or more classification engines, and responding, by the message hold decision maker, to the API call, the response including the determination made by the message hold decision maker.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
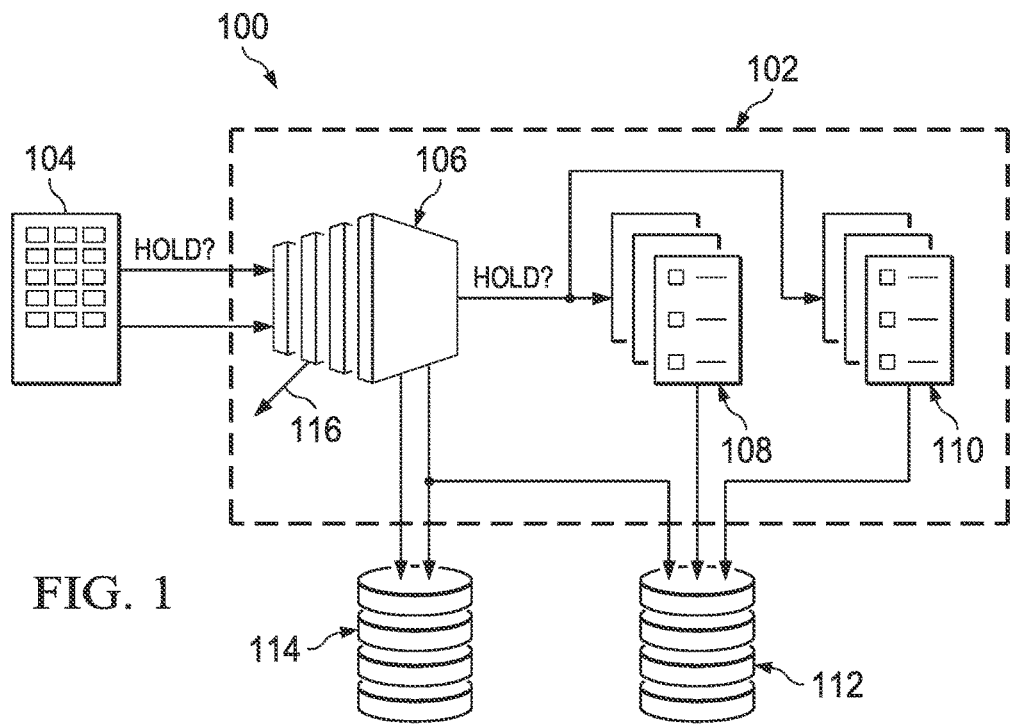
FIG. 1 depicts a diagrammatic representation of an electronic mail processing system operating over a protected computer network.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Generally, embodiments disclosed herein improve the efficacy and efficiency of an electronic mail processing gateway that processes electronic messages for a protected computer network. The disclosed embodiments are achieved by providing the electronic mail processing gateway with additional logic that makes fast and intelligent decisions on whether to hold, block, allow, or sandbox an electronic message in view of potential threats such as viruses, phishing, spam, sender IP reputation, malware, or URL-based threats that may not appear to be suspicious to conventional email processing gateways and/or threat protection systems.

In some embodiments, an electronic mail processing gateway (also referred to as a mail gateway or a processing protection system (PPS)) is adapted to detect, based on published data, suspicious content (e.g., attachments, URLs, etc.) in a message. If nothing suspicious is found (e.g., due to no known malicious content identified in an attachment or URL), the mail gateway makes an application programming interface (API) call, with metadata that describes the message, to a message-hold decision maker (MHDM). The MHDM, in near real-time, responds to the API call with a decision to hold, block, or allow the electronic mail message. In some examples, the decision can be to deliver or not deliver the electronic email message, then, if not delivered, a decision can be made to hold the electronic email message. For messages that are held, the MHDM will also make a decision whether or not to sandbox each held message. The methodology used by the MHDM to make a decision is described in detail below. The MHDM can reliably, efficiently, and intelligently provide the mail gateway with the near real time decision as to whether to hold a message or not, even if the message does not appear to be suspicious to other threat protection systems. In this way, the mail gateway is able to keep more URL-based threats out of the billons of messages that it processes every day and does so with a faster response time. The efficiency and effectiveness of the above-described solution, in turn, allows the processing capability of the mail gateway to scale when needed.

In response to receiving the decision from the MHDM, the gateway will either send the email to its intended recipient, block the email, or hold the email. If the decision is to hold the email, the gateway will place the email in a queue, and periodically ask the MHDM if it should continue holding the email, deliver the email, or block the email. A non-limiting example of an electronic message processing and threat protection system is illustrated in FIG. 1.

As illustrated in FIG. 1, an electronic mail processing system 100 operating over a protected computer network (not shown) may comprise an electronic mail processing gateway 104 and an MHDM system 102. The MHDM system 102 generally comprises a MHDM 106 and is supported by a pluggable framework of a plurality of classification engines, each of which is adapted for a particular function (e.g., threat detection, attack velocity evaluation, machine learning (ML), sandbox tracking, etc.). As is described in more detail below, the classification engines include a plurality of synchronous classifiers 108 and a plurality of asynchronous classifiers 110.

The synchronous classifiers 108 operate synchronous with the processing of email, and can return results to the MHDM 106 very quickly, and will have an immediate impact on decisions made by the MHDM 106 (described below) in response to the API calls. The synchronous classifiers 108 can be placed in a production mode as well as an audit mode, for testing purposes, for example.

The asynchronous classifiers 110 do not run synchronous with the processing of email, and therefore have less immediate impact on decisions made by the MHDM 106. Typically, asynchronous classifiers 110 are used for testing and sandboxing purposes, and will have an impact on future email traffic. In some embodiments, when data relating to a email message is sent to the synchronous classifiers 108, the same data is sent to the asynchronous classifiers 110. Although the asynchronous classifiers 110 may not generate results in time to be useful for that particular email message, the results of the asynchronous classifiers 110 are populated in the results cache 112 for use with respect to future email messages. As is described in more detail below, the MHDM 106 applies rules to results from the classification engines to make an accumulative decision to hold, block, allow, or sandbox the message.

FIG. 1 also shows a sandbox interface 116 that the MHDM 106 has with a plurality of sandboxes (not shown). The sandboxes could be implemented as a part of the MHDM system 102, or could be external to the MHDM system 102, as desired.

Results from both the synchronous classifiers 108 and asynchronous classifiers 110, past and present, as well as sandbox scan results, are stored in a results cache 112 for further analyses (e.g., audit, machine learning, etc.) and for adjustment of the pluggable framework. Also, as described below, other, external systems may also store data in the results cache 112. FIG. 1 also shows a request details cache 114 used to store details relating to requests originating from the gateway 104. Together, the caches 112 and 114 can help to determine when to end the hold time of an electronic mail message placed on hold (described below).

Figure 2:
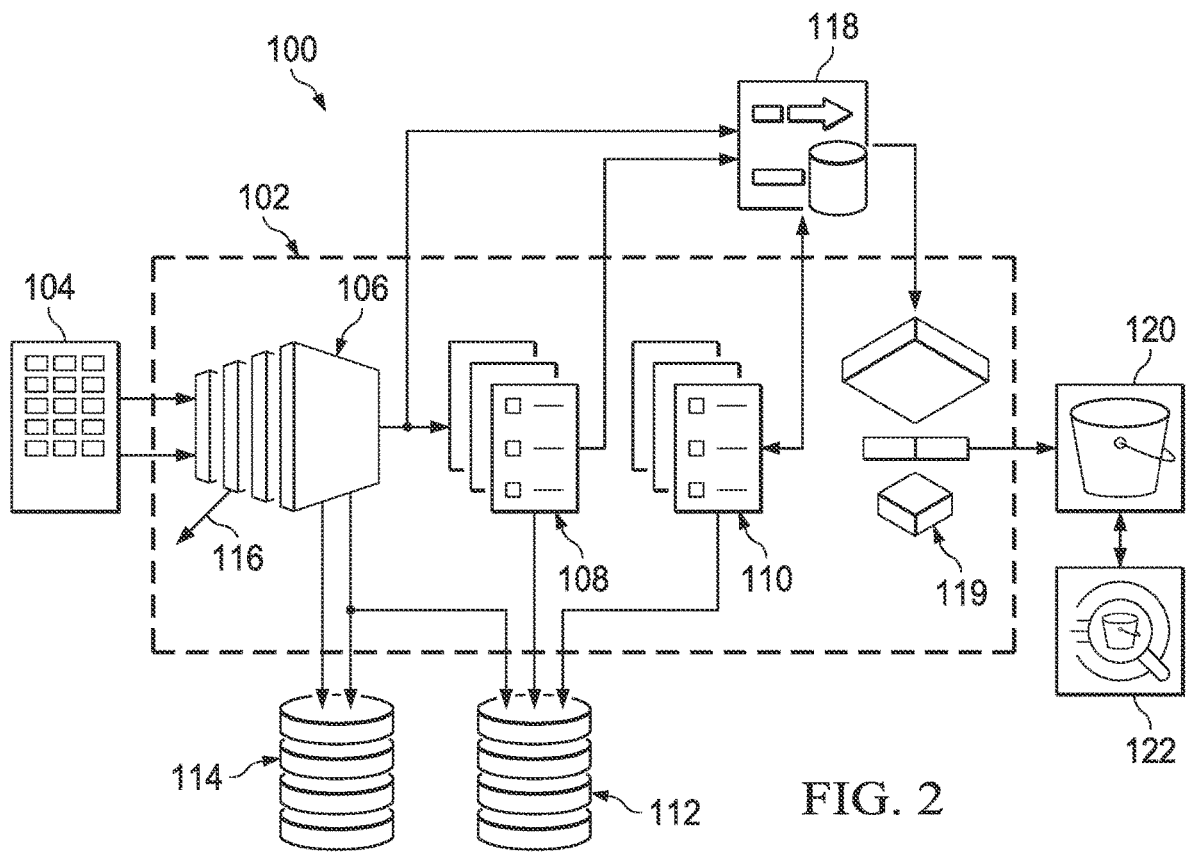
FIG. 2 depicts one exemplary implementation of an electronic mail processing system.

FIG. 2 is a non-limiting example of an implementation of the system 100 shown in FIG. 1. FIG. 2 shows all of the elements depicted in FIG. 1, but also shows downstream real-time data processing and archiving. As shown, a real-time data processing platform 118 is in communication with the MHDM 106, synchronous classifiers 108, and asynchronous classifiers 110. The real-time data processing platform 118 processes data and provides the data to archive module 119, which is configured to receive requests and classifier results. In this example, the archive module 119 provides data to an external data storage service 120. A query service 122 operates with the storage service 120 to provide services relating to the archived information. As mentioned, FIG. 2 is merely one implementation example of the system 100.

Figure 3:
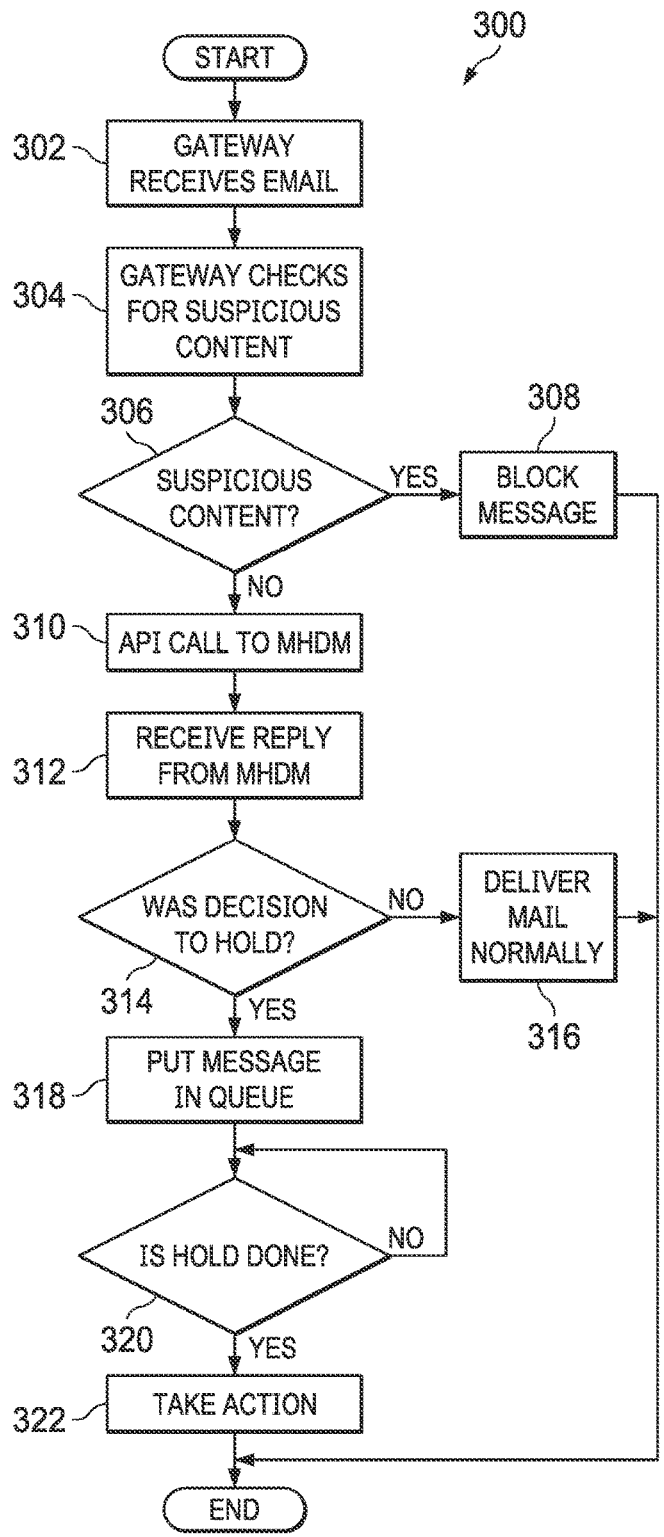
FIG. 3 is a flow diagram illustrating an example of the automatic processing of an incoming email message received by a mail gateway.

FIG. 3 is a flow diagram illustrating an example 300 of the automatic processing of an incoming email message received by the mail gateway 104. Generally, a job of the gateway 104 is to process incoming emails and distribute the emails to their intended recipients. However, since emails can contain malicious or harmful items (e.g., in an attached file, in an URL linking a malicious or harmful web site, etc.), another job of the gateway 104 is to prevent malicious or harmful items from harming devices on the protected network.

Referring again to FIG. 3, when the gateway 104 receives an email (302), the gateway checks the email for suspicious content (304). In some embodiments, the gateway 104 is adapted to detect, based on published data, suspicious content (e.g., content related to viruses, phishing, spam, sender IP reputation, malware, URL-based threats etc.) in a message. As an example, the gateway 104 may run virus scans on received emails. In another example, the gateway 104 can compare a URL in the email with known harmful URLs. In other words, the gateway 14 can use standard email traffic risk prevention measures in an attempt to detect suspicious content. If the gateway 104 finds something suspicious (306) (e.g., a positive virus scan, a known harmful URL, etc.), the gateway 104 may block the message (308), to prevent the message from harming the computing device of the intended recipient. In this scenario, the process shown in FIG. 1 is complete.

If the gateway 104 does not find anything suspicious (306) (e.g., due to no known malicious content in an attachment or URL), the gateway 104 makes an application programming interface (API) call, including metadata that describes the message, to the message-hold decision maker 106 (310). In near real-time, the MHDM 106 will reply (312) to the gateway 104 with a decision on how to handle the email. The process for determining that decision, by the MHDM 106, is described in detail below.

If the decision (314), as determined by the MHDM 106, is not to hold the email, the gateway 104 will deliver the email normally to its intended recipient (316). If the decision (314), as determined by the MHDM 106, is to hold the email, the gateway 104 will hold the message by placing the message in a queue (318) (e.g., for 5 to 10 minutes).

Thereafter, the gateway 104 will periodically check (320) the hold status (e.g., every 30 seconds). Once the gateway 104 receives and indication that the hold is done (described below), the gateway 104 will take an action (322). As a non-limiting example, the contents of the results cache 112 and request details cache 114 can indicate whether a hold applies. The action taken depends on the results of the classifiers and/or sandbox(es), but could include sending the email, blocking the email, etc.

Figure 4:
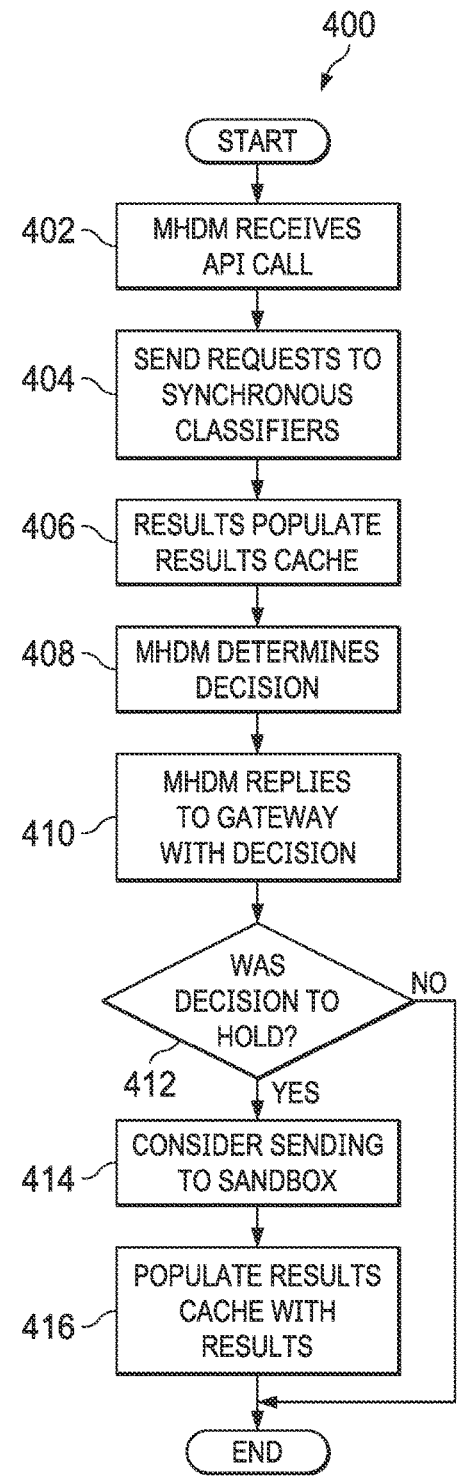
FIG. 4 is a flow diagram illustrating an example of the operation of an message-hold decision maker in an electronic mail processing system.

FIG. 4 is a flow diagram illustrating an example 400 of the operation of the MHDM during the automatic processing of an incoming email message received by the mail gateway. When the gateway 104 receives an email (discussed above) and does not find anything suspicious, the gateway 104 makes an API call to the MHDM 106. When the MHDM 106 receives the API call (402), the MHDM 106 will send requests to one or more of the synchronous classifiers 108 (404).

In some embodiments, the MHDM 106 sends requests to the classifiers 108 and 110 that are most relevant to the particular email message. For example, if the email message does not have an attachment, but has a URL, the MHDM 106 may select classifiers 108/110 that are adapted for that particular function (e.g., detecting harmful URLs). If the email message had an attachment and a URL, the MHDM 106 may select classifiers 108/110 that are adapted for either of the particular functions (e.g., detecting harmful URLs, virus detection, phishing detection, spam detection, etc.). In other embodiments, the MHDM 106 could send requests to all of the classifiers, and sort through all of the results as they populate the results cache 112.

As the synchronous classifiers 108 generate their results, the generated results will populate the results cache 112 (406). The MHDM 106 then determines a decision (408), based on the results of the synchronous classifiers 108 (and possibly on previous results stored in the results cache 112).

As a non-limiting example, the MHDM 106 can apply rules to the synchronous classifier results. In some embodiments, the MHDM 106 can generate a score based on the application of the rules, and then based on the score, determine a decision.

The MHDM 106 can be configured to determine a decision in any desired manner, as one skilled in the art would understand. Non-limiting examples of possible decisions include holding the message, blocking the message, allowing the message, sandboxing the message, etc. After a decision is determined (408), the MHDM 106 replies to the gateway 104 with the decision (410). As mentioned above, the reply to the API call occurs in near real-time.

If the determined decision was to hold the message (412), the MHDM 106 may consider analyzing the electronic mail message using in an isolated test environment, such as by sending the message to a sandbox (414). Generally, a sandbox is a security mechanism for separating running programs, in an effort to mitigate system failures or software vulnerabilities from spreading, as one skilled in the art understands. In some embodiments, a sandbox can be implemented in a virtual machine that emulates a host computer. The virtual machine can be configured to only allow access to predefined resources through the emulator. By observing the sandbox, it can be determined whether the content, URL, etc. suspected of being harmful is actually harmful. As with the classifier results, sandbox results populate the results cache 112 (416).

Referring again to FIGS. 1 and 2, results cache 112 and request details cache 114 can be part of a larger system of shared resources. The data stored in the caches 112 and 114 can be useful to a number of different systems. While the system described above uses the data stored in the caches 112 and 114 for the purpose of preventing malicious content from harming devices on a network, other systems can also benefit from same data. For example, another system or service on the network may use the data in the caches 112 and 114 for a different, but similar purpose, and would greatly benefit from the knowledge gathered by the electronic mail message system. For example, another system may be designed to analyze electronic mail messages that have already been delivered. Similarly, the electronic mail message system described here may benefit from data gathered by the other systems that share the caches 112 and 114. In this way, the caches 112 and 114 could be thought of as clearinghouses of information that can benefit many different systems.

One consideration to keep in mind with shared caches relates to data security. In some implementations, if may be necessary to keep data confidential, and therefore systems may not be able to share all of the data. Similarly, different system may reside or operating under different legal regimes with different privacy laws. Therefore, designers would have to take all of these factors into consideration when designing systems using shared data. In some embodiments, hybrid systems can be designed where certain data is kept confidential, while other data is suitable for sharing. These partitions could be based on geography, subject matter, company policies, and other considerations.

As described above, electronic mail processing system includes a plurality of synchronous and asynchronous classifiers, each adapted for a particular function (e.g., threat detection, attack velocity evaluation, machine learning, sandbox tracking, etc.). The system described can be implemented using any desired type of classifier, as one skilled in the art would understand. If desired, a user of the system could develop new classifiers, as needed. There are unlimited ways of developing and testing new classifiers, as one skilled in the art would understand. For example, assume a user of the system developed a new machine learning algorithm, and wished to use it with a new classifier. In one example, the user would want to test the new classifier with a live stream of traffic, to ensure that the new classifier worked as desired.

In some embodiments, the new classifier can be put in an "audit mode" and be allowed to consume real traffic and make decisions (e.g., hold/don't hold) based on the real traffic and the underlying algorithm. Then, the classifier's results can be analyzed to determine if the new classifier was making good decisions or not. If the new classifier made good decisions, the designer could choose to implement the new classifier in the system. If the new classifier generated its results fast enough, it could be used in the system as a synchronous classifier. If the new classifier made good decisions, but was relatively slow, the designer could choose to use the new classifier in the system as an asynchronous classifier.

Figure 5:
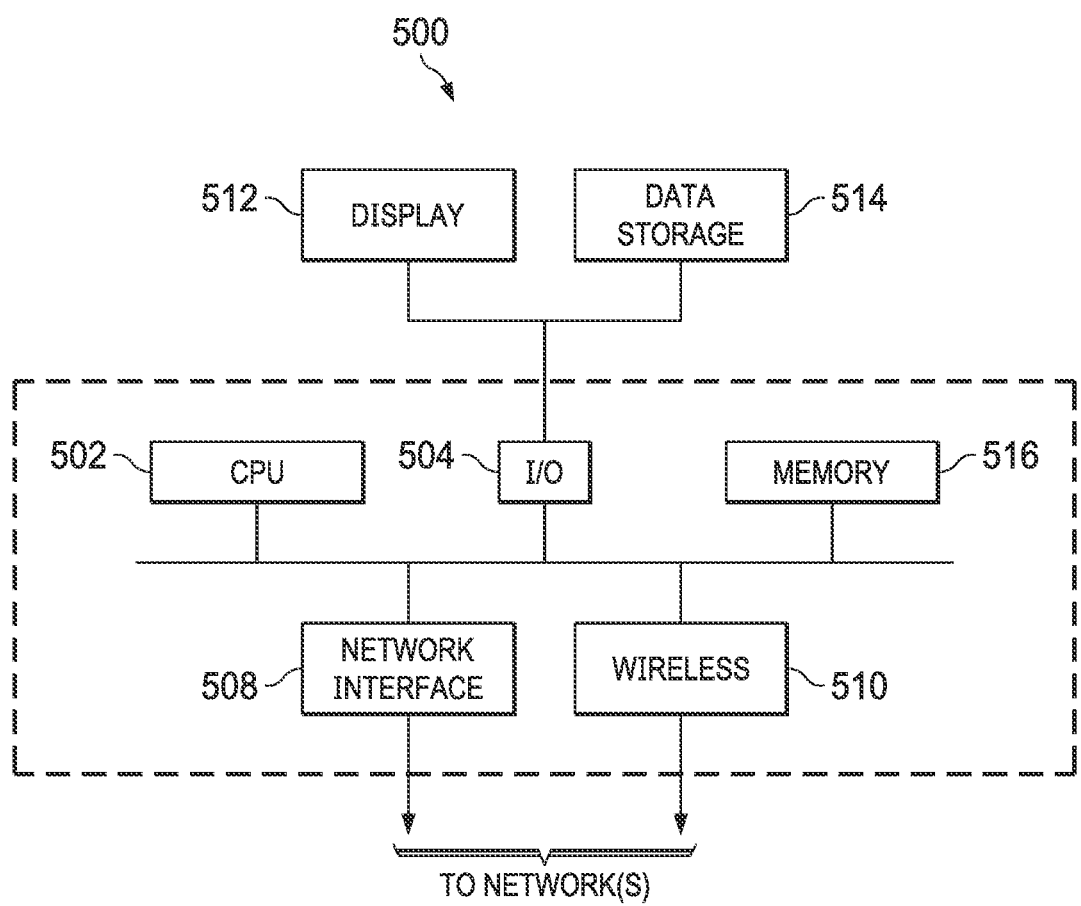
FIG. 5 depicts a diagrammatic representation of a data processing system for an electronic mail processing system according to some embodiments disclosed herein.

FIG. 5 depicts a diagrammatic representation of a data processing system for processing electronic messages for a protected computer network. As shown in FIG. 5, data processing system 500 may include one or more central processing units (CPU) or processors 502 coupled to one or more user input/output (I/O) devices 504 and memory devices 506. Examples of I/O devices 504 may include, but are not limited to, keyboards, displays, monitors, touch screens, printers, electronic pointing devices such as mice, trackballs, styluses, touch pads, or the like. Examples of memory devices 506 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 512, data storage device 514 and various peripheral devices (not shown), such as printers, plotters, speakers, etc. through I/O devices 504. Data processing system 500 may also be coupled to external computers or other devices through network interface 508, wireless transceiver 510, or other means that is coupled to a network such as a local area network (LAN), wide area network (WAN), or the Internet.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure and various features and advantageous details thereof are explained more fully with reference to the exemplary, and therefore non-limiting, embodiments illustrated and detailed in the accompanying appendixes A-D which forms part of this disclosure. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendixes, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendixes, the meaning of "in" includes "in" and "on" unless the context clearly dictates otherwise.

What is claimed is:

1. A method for processing electronic mail messages in a protected computer network, the method comprising:
   receiving, by an electronic mail processing gateway that processes electronic mail messages for the protected computer network, an electronic mail message;
   analyzing, by the electronic mail processing gateway, the electronic mail message to detect any malicious content in the electronic mail message;
   if nothing suspicious is found in the electronic mail message, making an application programming interface (API) call to a message decision maker, the API call including metadata describing the electronic mail message;
   determining, by the message decision maker, whether the electronic mail processing gateway should deliver the electronic mail message or not deliver the electronic mail message, wherein determining further comprises:
      selecting, from a plurality of classification engines, one or more classification engines determined as relevant to the electronic mail message based on one or more particular characteristics of the electronic mail message for which the selected one or more classifications engines are adapted;
      providing the metadata describing the electronic mail message to the selected one or more classification engines;
      detecting, by the selected one or more classification engines, the presence of malicious content in the electronic mail message; and
      making an accumulative decision on whether the electronic mail processing gateway should deliver the electronic mail message or not deliver the electronic mail message based on results from the selected one or more classification engines; and
   responding, by the message decision maker, to the API call with a response including the accumulative decision made by the message decision maker.

2. The method according to claim 1, wherein the malicious content detected relates to one of a computer virus, phishing, or spam.

3. The method according to claim 1, wherein the malicious content detected is a uniform resource locator.

4. The method according to claim 1, wherein analyzing the electronic mail message includes scanning the electronic mail message for suspicious content.

5. The method according to claim 1, wherein the message decision maker responds to the API call in near real-time.

6. The method according to claim 1, further comprising:
responsive to the response to the API call, the electronic mail processing gateway holding the electronic mail message in the queue; and
releasing the electronic mail message from the queue responsive to a message from the message decision maker.

7. The method according to claim 1, wherein determining whether the electronic mail processing gateway should deliver the electronic mail message or not deliver the electronic mail message further comprises applying rules to the results obtained by the one or more classification engines.

8. The method according to claim 1, further comprising storing the results obtained by the one or more classification engines in a results cache.

9. The method according to claim 1, further comprising:
responsive to the message decision maker determining that the electronic mail processing gateway should be not delivered, analyzing the electronic mail message using in an isolated test environment.

10. The method according to claim 1, wherein if the message decision maker determines that the electronic mail message should not be delivered, the response includes the determination to hold the electronic mail message.

11. A system for automatically processing electronic mail messages in a protected computer network, the system comprising:
a processor;
a non-transitory computer-readable medium; and
stored instructions translatable by the processor for:
receiving, by an electronic mail processing gateway that processes electronic mail messages for the protected computer network, an electronic mail message;
analyzing, by the electronic mail processing gateway, the electronic mail message to detect any malicious content in the electronic mail;
if nothing suspicious is found in the electronic mail message, making an application programming interface (API) call to a message decision maker, the API call including metadata describing the electronic mail message;
determining, by the message decision maker, whether the electronic mail processing gateway should deliver the electronic mail message or not deliver the electronic mail message, wherein determining further comprises:
selecting, from a plurality of classification engines, one or more classification engines determined as relevant to the electronic mail message based on one or more particular characteristics of the electronic mail message for which the selected one or more classifications engines are adapted;
providing the metadata describing the electronic mail message to the selected one or more classification engines;
detecting, by the selected one or more classification engines, the presence of malicious content in the electronic mail message; and
making an accumulative decision on whether the electronic mail processing gateway should deliver the electronic mail message or not deliver the electronic mail message based on results from the selected one or more classification engines; and responding, by the message decision maker, to the API call with a response including the accumulative decision made by the message decision maker.

12. The system of claim 11, wherein analyzing the electronic mail message includes scanning the electronic mail message for suspicious content.

13. The system of claim 11, wherein the message decision maker responds to the API call in near real-time.

14. The system of claim 11, wherein the stored instructions translatable by the processor further comprise:
responsive to the response to the API call, the electronic mail processing gateway holding the electronic mail message in the queue; and
releasing the electronic mail message from the queue responsive to a message from the message decision maker.

15. The system of claim 11, wherein determining whether the electronic mail processing gateway should deliver the electronic mail message or not deliver the electronic mail message further comprises applying rules to the results obtained by the one or more classification engines.

16. The system of claim 11, wherein the stored instructions translatable by the processor further comprise storing the results obtained by the one or more classification engines in a results cache.

17. The system of claim 11, wherein the stored instructions translatable by the processor further comprise:
responsive to the message decision maker determining that the electronic mail processing gateway should be held, analyzing the electronic mail message using in an isolated test environment.

18. The system of claim 11, wherein if the message decision maker determines that the electronic mail message should not be delivered, the response includes the determination to hold the electronic mail message.

19. A computer program product comprising a non-transitory computer-readable medium storing instructions translatable by a processor to perform:
receiving, by an electronic mail processing gateway that processes electronic mail messages for the protected computer network, an electronic mail message;
analyzing, by the electronic mail processing gateway, the electronic mail message to detect any malicious content in the electronic mail;
if nothing suspicious is found in the electronic mail message, making an application programming interface (API) call to a message decision maker, the API call including metadata describing the electronic mail message;
determining, by the message decision maker, whether the electronic mail processing gateway should deliver the electronic mail message or not deliver the electronic mail message, wherein determining further comprises:
selecting, from a plurality of classification engines, one or more classification engines determined as relevant to the electronic mail message based on one or more particular characteristics of the electronic mail message for which the selected one or more classifications engines are adapted;
providing the metadata describing the electronic mail message to the selected one or more classification engines;
detecting, by the selected one or more classification engines, the presence of malicious content in the electronic mail message; and
making an accumulative decision on whether the electronic mail processing gateway should deliver the electronic mail message or not deliver the electronic mail message based on results from the selected one or more classification engines; and responding, by the message decision maker, to the API call with a response including the accumulative decision made by the message decision maker.

20. The computer program product of claim 19, wherein the instructions further comprise:

responsive to the response to the API call, the electronic mail processing gateway holding the electronic mail message in the queue; and releasing the electronic mail message from the queue responsive to a message from the message decision maker.

21. The computer program product of claim 19, wherein determining whether the electronic mail processing gateway should deliver the electronic mail message or not deliver the electronic mail message further comprises applying rules to the results obtained by the one or more classification engines.

22. The computer program product of claim 19, wherein the instructions further comprise storing the results obtained by the one or more classification engines in a results cache.

23. The computer program product of claim 19, wherein if the message decision maker determines that the electronic mail message should not be delivered, the response includes the determination to hold the electronic mail message.

* * * * *